United States Patent [19]
Auer

[11] 3,715,590
[45] Feb. 6, 1973

[54] MICROMETEOROID ANALYZER

[75] Inventor: Siegfried O. Auer, Ludwigshafen-Rhine, Germany

[73] Assignee: The United States of America as represented by the Administrator of the National Aeronautics and Space Administration

[22] Filed: March 26, 1971

[21] Appl. No.: 128,419

[52] U.S. Cl. ............................ 250/83.3 R, 250/83 R
[51] Int. Cl. .............................. G01t 1/00, G01t 1/34
[58] Field of Search ..................... 250/83.3 R, 83 R

[56] References Cited

UNITED STATES PATENTS

| | | | |
|---|---|---|---|
| 3,626,189 | 12/1971 | Berg | 250/83.6 R |
| 3,450,879 | 6/1969 | Seppi | 250/83.3 R |
| 3,415,992 | 10/1968 | Webb | 250/83.3 R X |
| 3,529,161 | 9/1970 | Oosthoek et al. | 250/83.3 R |

*Primary Examiner*—Archie R. Borchelt
*Attorney*—Darrell G. Brekke and John R. Manning

[57] ABSTRACT

A system for measuring the direction of flight, velocity, charge, mass and chemical composition of micrometeoroids. The analyzer includes two spaced arrays of interconnected capacitors and an ion detector. Electrodes are fastened to the edge of each array. Micrometeoroids impinge on the arrays and generate signals at the electrodes. The magnitude of the signals is a function of the impact location. Ions accelerated from one array are focused on an ion detector to provide a time-of-flight mass spectrometer.

13 Claims, 6 Drawing Figures

INVENTOR
SIEGFRIED O. AUER

BY [signature]
ATTORNEY

PATENTED FEB 6 1973 3,715,590

INVENTOR
SIEGFRIED O. AUER

BY *Daniel G. Buhler*
ATTORNEY

MICROMETEOROID ANALYZER

The invention described herein may be manufactured and used by or for the United States Government without payment of any royalty thereon or therefor.

BACKGROUND OF THE INVENTION

1. Field of the Invention

The present invention relates generally to outer space particle detection systems and more particularly to a new and improved system for detecting the flight course, velocity, mass, charge and chemical composition of micrometeoroids.

2. Description of the Prior Art

In the copending application of Otto E. Berg, Ser. No. 789,044, filed Dec. 31, 1968, now U.S. Pat. No. 3,626,189 bearing the title "Cosmic Dust Sensor," commonly assigned with the present invention, as well as in an article "The Pioneer 8 Cosmic Dust Experiment," *The Review of Scientific Instruments*, Vol. 40, No. 10, October 1969, pages 1333–1337, there is disclosed a device for detecting the impact position of cosmic dust and other similar outer space particles. The device disclosed therein includes a metal film electrode having a bias voltage applied thereto. In response to a particle impinging on the film, a plasma stream is generated. The direction of the plasma stream has a tendency to be aligned with the line of flight of the particle impinging on the electrode, although there is anisotropic spreading of the plasma stream to form a plasma spray. Electrical changes in the plasma stream are either returned to the film or collected by a grid electrode electrode arrangement in proximity to the film. The grid is biased oppositely from the film so that changes of one polarity are collected by the film and charges of the other polarity are collected by the grid.

To determine the impact position of a particle on the detector including the film and grid, each of the film and grid electrodes is an array comprised of a multiplicity of electrode strips. The film and grid strips have parallel, longitudinally extending axes, with the strips of the grid and film mutually orthogonal to each other. By determining the strips in the grid and film array which collect charges in the plasma stream, it is possible to determine the position of particle impact.

In the prior art device, a separate amplifier is employed for each strip in the film and grid arrays. A prior art device having a resolution of four square millimeters and a detecting surface on the order of 10,000 square millimeters, requires approximately 100 amplifiers. The use of such a large number of amplifiers in an outer space particle detector is disadvantageous from the standpoints of weight, reliability and power consumption.

In my copending application entitled "Cosmic Dust Impact Location Detector," Ser. No. 102,412, filed Dec. 29, 1970, now U.S. Pat. No. 3,626,187, I disclose another particle impact detector of the electrode-strip variety. In that invention, only two amplifiers are required for the entire array instead of one amplifier for each strip.

Valuable data can often be obtained by viewing a detector after it has been bombarded by micrometeoroids. It generally requires one man hour to scan a one square centimeter area of detector surface with a microscope; and it is very important to provide a particle detector with the maximum possible resolution so that the microscope operator can direct his attention to a minimum search area.

A micrometeoroid detector with a time-of-flight mass spectrometer is disclosed in "Detection Technique for Micrometeoroids Using Impact Ionization," S. Auer and K. Sitte, *Earth and Planetary Science Letters*, North-Holland Publishing Company, Amsterdam, No. 4, 1968, pages 178–183. This prior art detector includes five grids, a target, a cylindrical lens, a long cylindrical ground electrode, a control collector and an ion detector. Some of its disadvantages are as follows: (a) no discrimination of different impact locations or micrometeoroids; (b) velocity measurements possible only indirectly and with considerable uncertainty; (c) the instrument is ion-optically optimized only for impacts occurring on a small fraction of the target area; (d) low-mass spectroscopic resolution; (e) small ratio of sensitive target area to weight of instrument; (f) small acceptance angle; and (g) impractical length of instrument (1.20 meters).

OBJECTS OF THE INVENTION

It is, accordingly, an object of the present invention to provide a new and improved system for detecting the impingement position of micrometeoroids.

Another object of the invention is to provide a system for accurately determining the flight direction and velocity of micrometeroids.

It is a further object of the invention to provide a detector for determining the charge, mass, and chemical composition of micrometeroids.

Another object of the invention is to provide a system for detecting impact location requiring only three amplifiers, regardless of the location resolution.

Still another object of the invention is to provide a detector with mechanical shielding means for eliminating electrical crosstalk and enhancing location resolution.

These and other objects, features, and advantages of the present invention will become apparent as the description proceeds.

SUMMARY OF THE INVENTION

The micrometeoroid detector of the present invention is based on the principle that a plasma of electrons and ions is released when a micrometeoroid impinges on a target. Two targets are placed in the path of the micrometeoroid, the micrometeoroid piercing the first target to reach the second. The ions are emitted from the target at the impact point whereas the electrons travel through the target. The electrons and some of the ions are measured in order to determine the micrometeoroid impact positions, flight path, charge, velocity, mass and chemical composition.

Each target or detector comprises an array of tiny, interconnected capacitors. Three electrodes are spaced about the periphery of the array and connected to capacitors thereunder. When a micrometeoroid impacts on a tiny capacitor in the array, step pulses having magnitudes A, B and C, respectively, are coupled to the three electrodes. The amplitude of each electrode signal is a function of the capacitive coupling between the point of impact and that particular electrode. By manipulating the signals to measure the ratios $(A)/(A + B + C)$ and $(C)/(A + B + C)$, the coordinates of the impact point are unequivocally located. Resolution is based upon capacitor size not the number of amplifiers and only three amplifiers are needed regardless of the resolution. Mechanical barriers are provided on the surface of the array to prevent crosstalk and degradation of the location resolution.

The impact location of the micrometeoroid on the second detector is determined in the same manner. The direction of the micrometeoroid is computed once the two impact points are known. The transit time and distance between the two detectors are measured. The micrometeoroid velocity is calculated from this information. The signals at the three array electrodes are summed to obtain the total charge of the micrometeoroid. Ions emitter from the second detector are focused on an ion detector to provide a time-of-flight mass spectrometer. The micrometeoroid analyzer has a very wide angle of acceptance and the major portion of the second target or detector surface is sensitive for ion measurement purposes.

DESCRIPTION OF THE PREFERRED EMBODIMENTS

Figure 1:
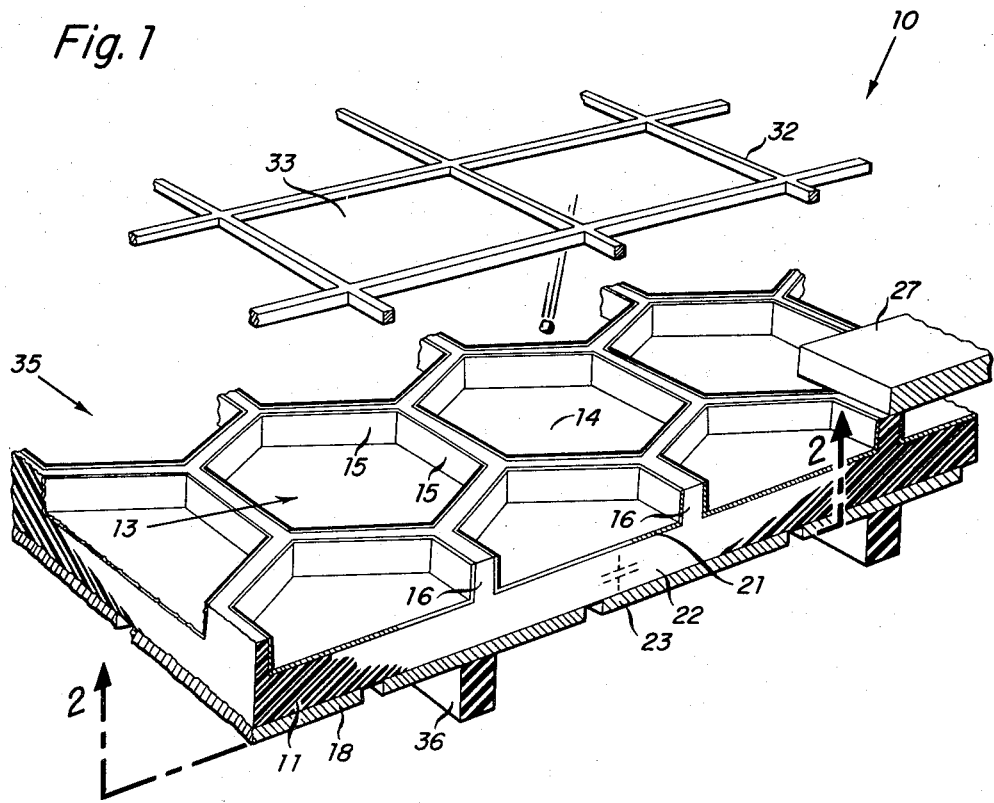
FIG. 1 is a cutaway perspective, exploded view of the apparatus utilized for ascertaining micrometeoroid impact position in accordance with the invention.

Referring now to the drawings, wherein like reference numerals designate identical or corresponding parts throughout the several views, the detector 10 (FIG. 1) comprises grid 32 and capacitive array 35. The capacitive array 35 comprises a dielectric substrate 11 sandwiched between multiple discrete electrical conductors 13 and 18. The particle entrance side of the detector is covered with cup-shaped conductors 13 each comprising a hexagon-shaped base portion 14 electrically connected to rectangular side portions 15. Dielectric walls 16 separate the conductors 13. The opposite surface of the substrate (the side on which the micrometeoroids exit) is covered with multiple discrete electrical conductors 18. Conductors 18 are hexagonally shaped and have an area substantially identical to those of base portions 14. The dielectric 11 may, for example, by Parylene, a product of Union Carbide Corporation. To insure micrometeoroid penetration, the dielectric 11 will preferably be 1,500 to 500 Angstroms thick. The electrical conductors 13 and 18 may, for example, be gold vacuum deposited on the dielectric substrate 11. A suitable conductor thickness is 100 Angstroms.

It should be noted that for the sake of clarity various dimensions are shown in the figures in disproportion to one another. Particularly, the dimensions of certain layers of the detector are shown on an exaggerated scale.

Figure 2:
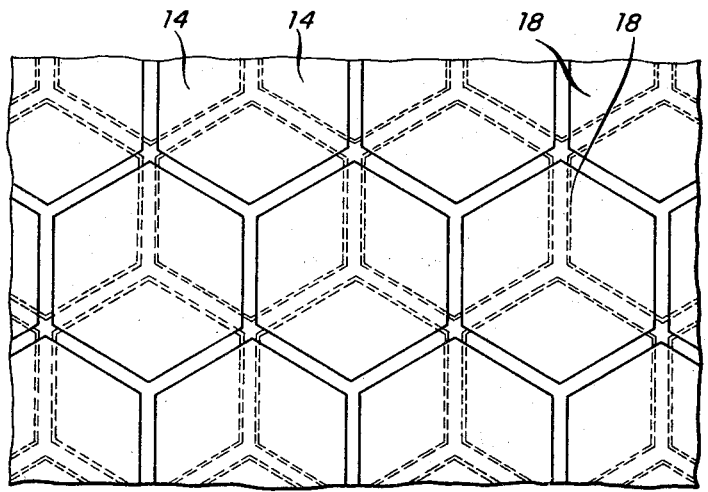
FIG. 2 is a plane view of a portion of the capacitive array of FIG. 1.

FIG. 2, a plan view of conductors 13, substrate 11, and conductors 18, illustrates how each conductor 18 overlaps identical portions of three conductors 13 (each having a base portion 14). Capacitors are formed wherein a conductor 18 overlaps a conductor 13. For example, the laminate combination comprising segment 21 of conductor 13 (FIG. 1), segment 22 of dielectric substrate 11, and segment 23 of conductor 18 forms a capacitor. Based on the resistivity properties inherent in the material used for substrate 11, segment 22 between segment 21 and segment 23 will provide a certain resistance in parallel with the capacitor. Ignoring resistances, the cup-shaped electrical conductors 13, the dielectric substrate 11, and the electrical conductors 18 form a large and intricate network of capacitors. Each conductor 18 is directly capacitively coupled to three conductors 13, those three conductors 13 are capacitively coupled to six conductors 18, etc.

The dielectric constant ($\epsilon$) of Parylene is 2 and its resistivity ($\rho$) is $10^{10}$ ohms. If such a material $5 \times 10^{-7}$m thick were used for substrate 11, and if an electrical conductor 13 overlapped a conductor 18 $10^{-5}$m$^2$, the resulting capacitance would be 360 pf and the resistance in parallel with the capacitance would be $5 \times 10^8 \Omega$. The amount of parallel resistance is not critical; however, the time constant RC should lie between the charge collection time (several microseconds) and the time between two micrometeoroid impacts. Typically, the value of the parallel resistance R can vary between $10^4$ and $10^{10} \Omega$.

Electrode 27 is one of three electrodes (27, 28 and 29) peripherally located on the top surface of capacitive array 35. Electrode 27 is contiguous to and electrically connected to at least one conductor 13. The area of these peripheral electrodes is not critical. When a micrometeoroid particle impinges on the capacitive array 35 an electrical signal is produced between electrode 27 and the electrical conductors 18 directly under it. Electrical signals are also generated at the other peripheral electrodes (28 and 29).

A metal grid 32, coextensive in size with substrate 11, is spaced parallel to substrate 11. The ratio of the area of the grid aperture 33 to the area of the grid surrounding the aperture should be as great as possible to maximize the number of micrometeoroid particles reaching the capacitive array 35. A grid-shaped support 36 may be fastened to conductors 18 and dielectric substrate 11 to maintain the capacitive array planar. The support should be made with an electrically insulative material, for example, plastic or ceramic, to prevent shorting of conductors 18. The support dimensions should permit optimum micrometeoroid transmission.

Figure 3:
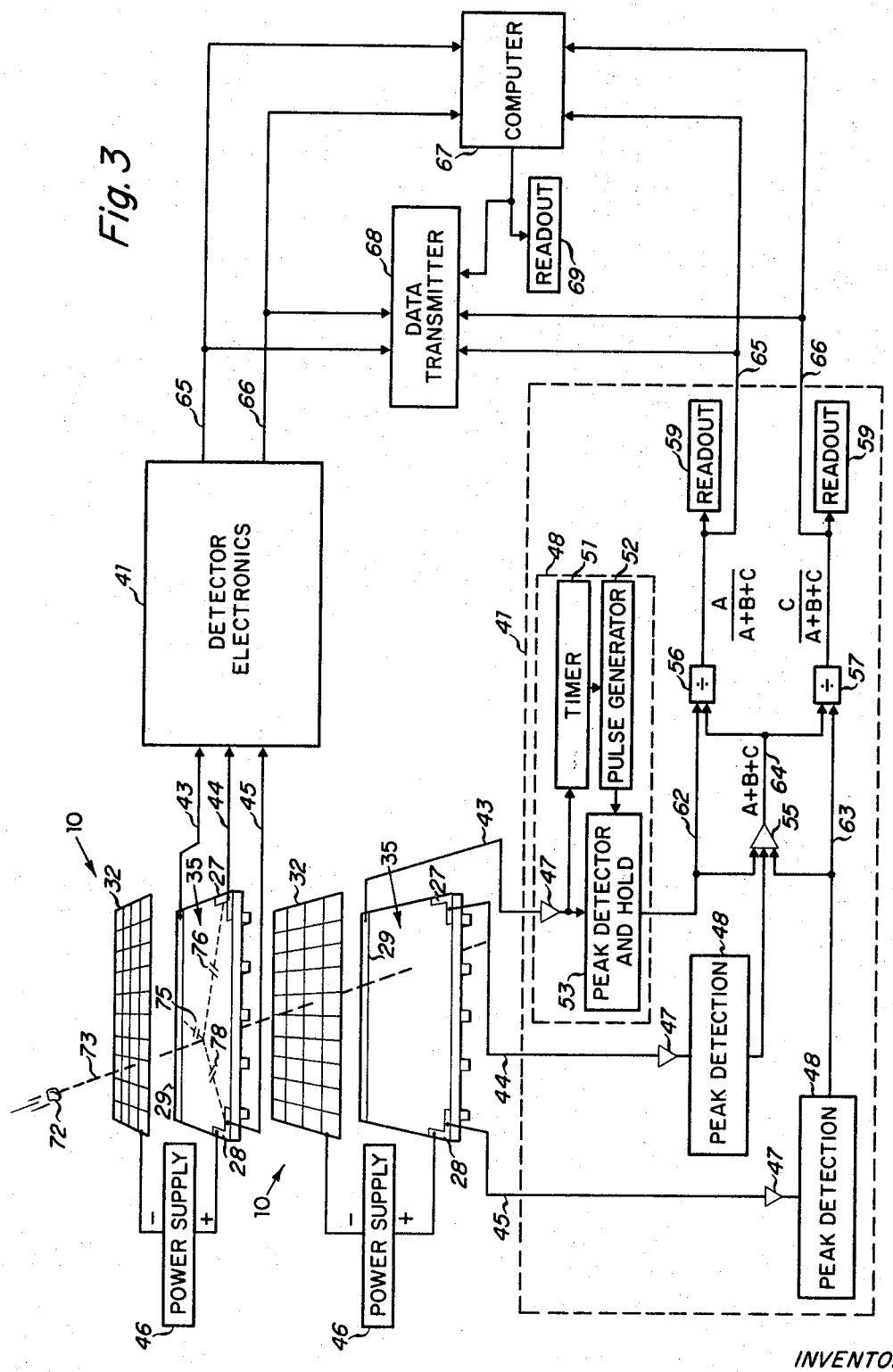
FIG. 3 is a block diagram, partially perspective, of a micrometeoroid detection system utilizing the detector of FIG. 1.

Referring now to FIG. 3, a first detector 10 is registered with and suspended over a second detector 10. The peripheral electrodes 27, 28 and 29 on capacitive array 35 are connected to a detector electronics circuit 41 by means of connections 43, 44 and 45. The detector electronics circuit comprises three amplifiers 47, three peak detection circuits 48, a summing amplifier 55, two dividers 56 and readout means 59. The peak detection circuit 48 comprises a timer 51, a pulse generator 52 and a peak detector and hold circuit 53. The output of amplifier 47 is fed to the input of timer 51 and the input of peak detector and hold circuit 53. The output of timer 51 is connected to the input of pulse generator 52. The output of pulse generator 52 is fed to the peak detector and hold circuit 53. When a pulse signal is received on one of the peripheral electrodes of the capacitive array 35, it is amplified in amplifier 47. The leading edge of the pulse signal starts timer 51. After a predetermined period t, timer 51 causes pulse generator 52 to initiate a pulse. The maximum amplitude of the pulse signal fed into peak detector and hold circuit 53 is detected and held until the pulse from generator 52 restores the peak detector 53 to its normal state and removes the voltage held at the output of the peak detector 53. The peak detector is polarized to only be sensitive to negative pulses from the peripheral electrodes. Peak detector and hold circuits are old and well known. A very simple peak detector and hold circuit may, for example, comprise a diode, a capacitor, and an SCR (the SCR being employed to short the capacitor and remove the charge held on the capacitor). Timer 51 and pulse generator 52 may, for example, each comprise a multivibrator of the nonstable variety. The outputs of the three peak detection circuits 48 are fed to summing amplifier 55. The outputs of two of the peak detection circuits are also fed to dividers 56 and 57 by means of connections 62 and 63, respectively. Summing amplifier 55 generates a signal at its output which is representative of the sum of all three input signals. The output of the summing amplifier is simultaneously connected to dividers 56 and 57 by means of connection 64. The output of each divider is fed to a readout 59. The signal at the output of divider 56 is a function of the signal on connection 62 divided by the signal on connection 64. Likewise, the signal at the output of divider 57 is a function of the signal on connection 63 divided by the signal on connection 64.

Dividers are old and well known in the analog computer art. Suitable dividers are disclosed in *Electronic Analog Computers*, Granino A. Korn and Theresa M. Korn, Second Edition, McGraw-Hill Book Company, Inc., 1956, page 339. If desired, the dividers may comprise two logarithmic amplifiers. The signal representative of the numerator is fed to one amplifier and the signal representative of the denominator is fed to the other amplifier. Then the outputs are subtracted to provide the quotient. Readout 59 can be any voltage measuring device, either one providing an ephemeral presentation or one providing a permanent record.

Outputs 65 and 66 from the dividers are fed into a computer 67 having a readout 69. The outputs from the dividers are simultaneously fed to a data transmitter 68 along with the output of computer 67.

In operation, when a micrometeoroid particle 72 having a flight path 73, impacts on capacitive array 35, a plasma of ions and electrons is produced. The electrical field applied between the capacitive array 35 and the grid 32 by means of power supply 46 separates the ions from the electrons. The ions travel to or through the grid while the electrons are retained in the capacitive array. The charge of the electrons changes the electrical potential of the capacitor in the array hit by the micrometeoroid. This step pulse (negative) is coupled through the capacitive network to electrodes 27, 28 and 29. There is an equivalent capacitance 75 between the point of impact and electrode 29; an equivalent capacitance 76 between the point of impact and electrode 27; and finally, there is an equivalent capacitance 78 between the point of impact and electrode 28. The electrons favor the paths with the highest capacitive coupling. The shorter the distance between the point of impact and a peripheral electrode, the greater is the capacitive coupling. As the distance between the point of impact and the peripheral electrode is increased, the pulse amplitude at the electrode is decreased. Hereinafter, for clarity in showing the processes in the electronic circuitry, the maximum signal excursions (negative), or signals representative thereof, associated with electrodes 29, 27 and 28 shall be referred to as A, B and C, respectively. The peak signal excursions A, B and C held at the respective outputs of the peak detection circuits are added in summing amplifier 55. The output signal $A + B + C$ is coupled to dividers 56 and 57. Signal A is fed into divider 56 as well as summing amplifier 55. The divider generates an output signal which is a function of the ratio of the two input signals, namely $(A)/(A + B + C)$. Since signal C is fed into divider 57 along with signal $A + B + C$, the output signal generated from the divider is $(C)/(A + B + C)$, the ratio of the input signals. The two divider outputs are indicated or recorded at readouts 59. The period t of timer 51 should be sufficient to enable the indication or recording at readout 59. After period t, pulse generator 52 will clear the signal held at the output of the peak detector and hold circuit 53 and make it ready for another incoming pulse.

The position of the micrometeoroid impact on capacitive array 35 is an unequivocal function of the measured ratios $(A)/(A + B + C)$ and $(C)/(A + B + C)$. The value of the ratios for a given position can be determined mathematically or empirically (a voltage probe can be moved from position to position on the array while the ratios are measured, etc.). Readouts 59 can be calibrated directly in terms of position on the array.

After the front detector 10 is penetrated by the micrometeoroid 72, the meteoroid continues through grid 32 of the rear detector 10 and impacts on the capacitive array 35 of the rear detector. Pulse signals having maximum excursions A, B and C are similarly generated at electrodes 27, 28 and 29. The signals generated at the outputs of dividers 56 and 57 associated with the rear detector 10 define the impact coordinates on the rear capacitive array. Two points are all that are necessary to define a straight line, so once the position of impact on the front detector and the position of impact on the rear detector are known, the vector or flight path 73 of the micrometeoroid 72 is known. The four ratio signals are fed to computer 67 which computes the direction and simultaneously sends the direction information to readout 69 and data transmitter 68. Data transmitter 68 transmits the direction data and the four ratio signals to a remote receiver which may be, for example, on Earth. At the receiver (not shown) the four ratio signals may be employed to redundantly determine the micrometeoroid flight path, etc.

When a micrometeoroid impinges on the array, spray is ejected anisotropically. The spray comprises solid fragments and plasma of the micrometeoroid and/or the array materials. Walls 16 of the array provide mechanical shielding and tend to confine the spray to a signal array cavity. This prevents electrical crosstalk and ambiguous identification of the impact location. A suitable wall height (wall portion 15) to base width (base portion 14) is one to five.

Figure 4:
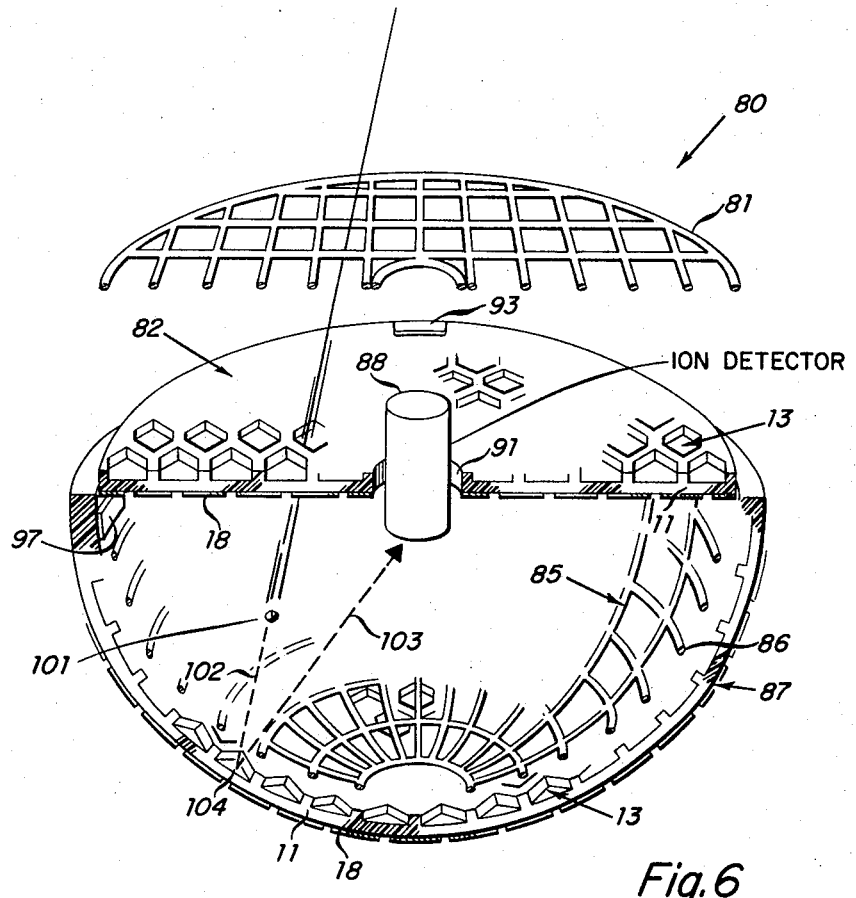
FIG. 4 is a schematic cutaway perspective of another transducer embodiment.
Figure 5:
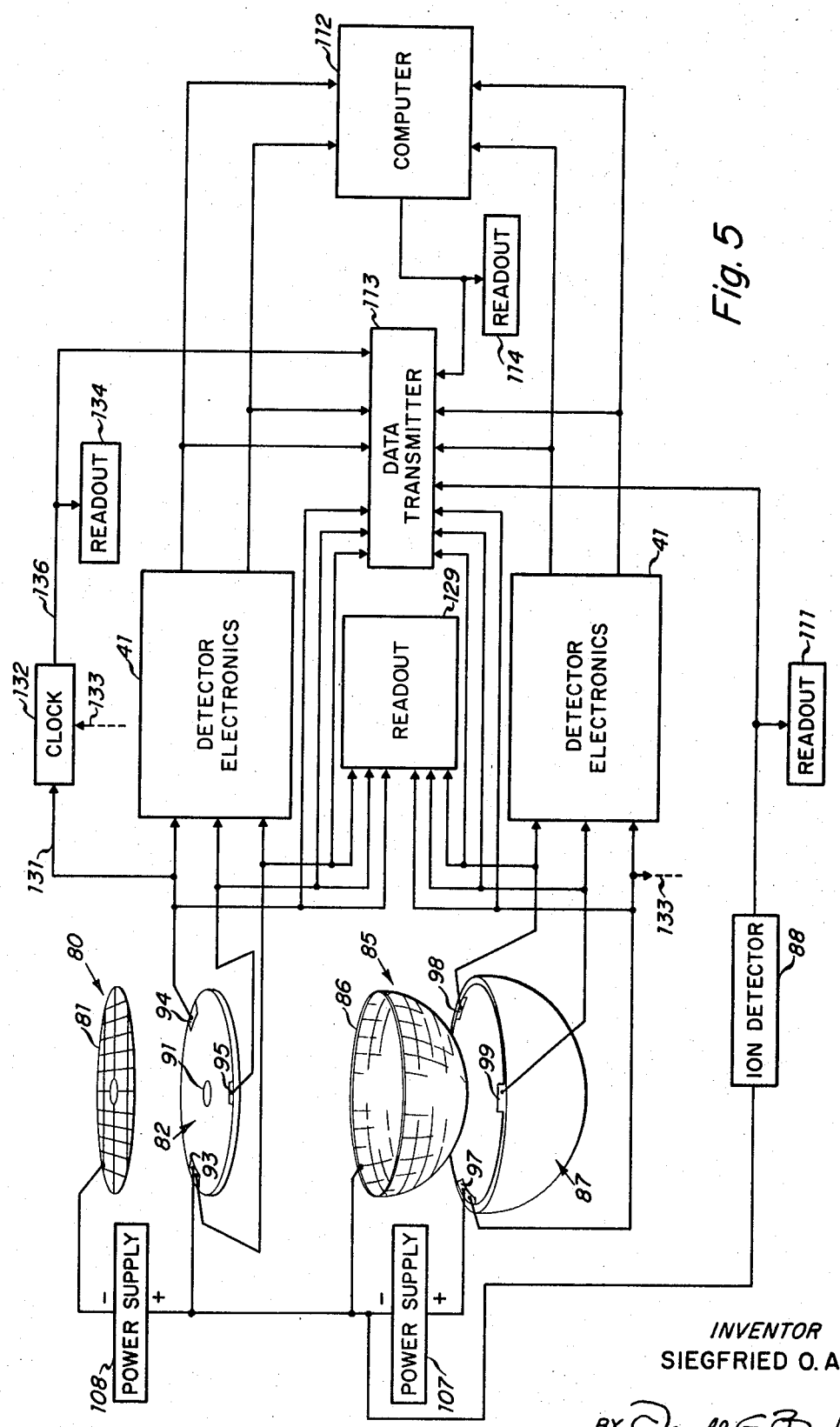
FIG. 5 is a block diagram, partially perspective, of a micrometeoroid detection system utilizing the transducer apparatus of FIG. 4.

An alternate embodiment of the invention is shown in FIGS. 4 and 5. A planar front detector 80 comprising grid 81 and capacitive array 82 is suspended over hemispherically-shaped rear detector 85 comprising grid 86 and capacitive array 87. Capacitive arrays 82 and 85 have overlapping conductors and interconnected capacitors just like arrays 35. The capacitors are formed from dielectric 11 and electrical conductors 13 and 18. Capacitive array 82 is toroidal shaped and an ion detector 88 is fixed in aperture 91. Capacitive array 85 is hemispherical. The input of ion detector 88 is located at the center of the hemisphere. Three electrodes 93, 94, and 95 are peripherally located and electrically connected to the top surface of capacitive array 82. These electrodes are comparable to electrodes 27, 28 and 29 in capacitive array 35. Electrodes 97, 98 and 99 are situated at the edge of the hemisphere on the inside surface and they are electrically connected to the respective conductors 13 thereunder. These electrodes are also comparable to electrodes 27, 28 and 29 on array 35.

Referring now to FIG. 5, electrodes 93, 94 and 95 are fed to a detector electronics circuit 41 and electrodes 97, 98 and 99 of capacitive array 87 are fed into another detector electronics circuit 41. All six electrodes are simultaneously coupled to readout 129 and data transmitter 113. A power supply 108 is connected between grid 81 and electrode 94 in order to produce an electric field between the grid 81 and array 82. A power supply 107 is similarly connected between electrode 97 and grid 86 to produce an electric field between the grid and capacitive array 87. The input of ion detector 88 which may be, for example, a Channeltron (a product of Bendix) is connected to the negative terminal of power supply 107 and maintained at the same potential as grid 86. The output of ion detector 88 is connected to readout 111 and data transmitter 113.

Electrodes 94 and 97 are connected to clock 132 by means of leads 131 and 133, respectively. When a pulse is received on input lead 131, the clock 132 is started and it continues until a stop pulse is received on input lead 133. The output of clock 132 is coupled to readout 134 and data transmitter 113. Readout 134 produces an indication and/or a recording of the time elapsed between the start and stop pulses. This period represents the time of flight of a particular micrometeoroid between the front detector and the rear detector. As in the previous embodiment, the outputs of the two detector electronics circuits are fed into a computer (112). The same outputs are simultaneously fed to data transmitter 113. A readout 114 is coupled to the output of computer 112 and the output of computer 112 is also fed into data transmitter 113. the readouts 59 in the detector electronics circuit may be calibrated directly in terms of impact location.

After the micrometeoroid 101 penetrates capacitive array 82, it passes through hemispherical grid 86 and impinges on array 87 at point 104. A plasma of ions and electrons is produced. The ions are representative of the projectile material and the array material. The ions are accelerated in the electric field between the capacitive array 82 and grid 86 and are ejected into the field free region between the grid and the ion detector 88. Since the electric field is hemispherically shaped, most of the ions are focused on the ion detector. Tests with simulated micrometeoroids indicate that a very small percentage of the emitted ions, generally those representative of the array material, are released with high energies and with directions nearly parallel to the surface of the array. The bulk of the ions are released with relatively low energies and with paths substantially normal to the array surface. The ion discrimination is very desirable. The high energy ions are not necessary to the measurements. Additionally, resolution at the ion detector is degraded if the ions with high initial energies are among those with low initial energies.

The charge of electrons at the impact point 104 changes the electrical potential of the capacitor struck by the micrometeoroid. This resulting negative pulse is coupled through the capacitive array to electrodes 97, 98 and 99. The magnitude of these pulses (A, B and C) is a function of the input location and the amount of capacitance between the point of impact and the respective electrode. As in the other described arrays, ratio signals $(A)/(A+B+C)$ and $(C)/(A+B+C)$ are respectively generated at the two outputs of the detector electronics circuit. These signals describe the location of point 104 and the readouts 59 in the detector electronics circuit may be calibrated directly in terms of location. The four ratio signals from the two detector electronics circuits are fed to computer 112 which is programmed to compute the direction of the micrometeoroid and the distance the micrometeoroid traveled between the capacitive arrays 82 and 87. This data is indicated or recorded by readout 114 and transmitted to a remote location by data transmitter 113.

When the micrometeoroid 101 strikes capacitive array 82, the pulse produced at electrode 94 starts clock 132. The clock continues to run until the micrometeoroid impacts on capacitive array 87. The pulse generated at electrode 97 stops the clock and readout 134 indicates and/or records the micrometeoroid transit time from the front detector to the rear detector. The clock is automatically reset if the micrometeoroid fails to reach the second detector after a predetermined period. Since the distance between the two array impact points is known as well as the transit time between the arrays, the velocity of the micrometeoroid can be easily calculated by dividing the distance by the time.

Based on micrometeoroid simulation experiments conducted with an electrostatic hypervelocity accelerator it has been empirically determined that $Q = 1.5\, m^{2/3}\, v^{5/2}$ where $Q$ = total charge of ions (in units of $10^{-15}$ coulombs), $m$ = micrometeoroid mass (in units of $10^{-15}$ kg), and $v$ = micrometeoroid velocity (in km/s). Micrometeoroid 101 may have a primary charge before it reaches detector 80. If such a charge exists, it will usually be very small in relation to the charge caused by the impact on the capacitive array. The primary charge will normally be positive. If such a charge exists on micrometeoroid 101, a positive-going pulse will start to occur on each of the peripheral electrodes 93–95 after the micrometeoroid passes grid 81. The pulse will reach a maximum and reverse direction when the micrometeoroid impacts on the capacitive array. The signals will continue going in the negative direction until the signals reach a maximum (A, B and C) and return to zero. The positive pulse will be small in relation to the negative pulse. Readout 129 indicates and/or records both the positive, if any, and negative pulses at the peripheral electrodes and permits the total charge at each electrode (the charge represented between the positive peak and the negative peak) to be measured. The sum of the total charges at the three peripheral electrodes (either at the front detector or the rear detector) is the total charge Q of the micrometeoroid. By substituting the knowns, Q and v, in the above-mentioned equation, the mass of the micrometeoroid 101 can be calculated. The slopes of the front edges of the negative-going pulses at the peripheral electrodes will be substantially identical and will be indicative of the velocity of the micrometeoroid.

Figure 6:
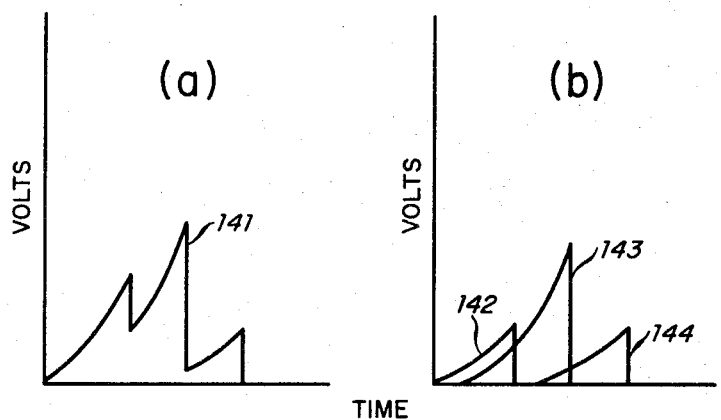
FIG. 6 graphically depicts waveforms associated with the ion detector.

The rear detector 10 and the ion detector 88 cooperate to make a time-of-flight mass spectrometer. When the micrometeoroid 101 reaches point 104 and collides with the capacitive array 87, ions representative of the micrometeoroid constituent elements and isotopes will be emitted and focused on ion detector 88. Some ions representative of the array constituent elements will also be focused on the ion detector. The ions with the smaller masses will reach the ion detector before the ions with the larger masses. The ions associated with a particular element (or isotope) will not necessarily arrive at the ion detector simultaneously. If all of the ions associated with a particular element have no initial energy, the electric field between the grid 86 and capacitive array 87 will treat the ions uniformly and they will arrive essentially simultaneously at the ion detector. If some of the ions have an initial energy, they will reach the ion detector before the ions lacking an initial energy. Waveform 141 of FIG. 6(a) represents a typical portion of the output signal of ion detector 88. Waveform 141 is made up of pulses 142, 143 and 144. The area of each pulse represents the ions associated with one particular element or isotope. The peak of each pulse represents ions having no initial energy. The output of ion detector 88 is calibrated so that each burst or pulse is identified with a particular element or isotope. (The time it takes each group of ions to reach the ion detector can be calculated by utilizing the conservation of energy equation $$eV = \tfrac{1}{2}mv^2$$

where e = charge of ion, V = accelerating voltage, m = mass of ion, and v = velocity of ion.) Since the materials used to make conductors 18 and dielectric 11 will be known, the ion spectra (signal output of ion detector) relates to the micrometeoroid constituents can be distinguished from the ion spectra related to array constituents. The spectra will reveal the presence of a particular element or isotope and additionally it will reveal the ratio of one element to another, etc.

The electrical conductors 13 and 18 have been depicted hexagonally for illustrative purposes. Other geometric forms such as the square may also be utilized. Since a micrometeoroid need only penetrate the front detector, the rear detector can be much thicker than the front detector.

Suitable signals can be obtained at the array peripheral electrodes even if the ions are not extracted from the array. Accordingly, the grids are not necessary for making measurements at the peripheral electrodes. However, extraction of ions from detector 85 is necessary for obtaining an ion mass spectrum.

Capacitive arrays 35 may take alternate forms other than rectangular and there is no requirement that they be planar. In the embodiment of FIG. 3, the front detector need not be parallel to the rear detector and the detectors may be of unequal sizes. For example, the front detector could be triangular shaped and the rear detector could be oval shaped.

To increase the chances of obtaining the necessary data even in the face of a partial equipment failure, four peripheral electrodes may be employed on each array. The coordinates of the impact will then be defined by any two of the following ratios: (A)/A + B + C + D); (B)/(A + B + C + D); (C)/(A + B + C + D); (D)/(A + B + C + D). If, for example, the amplifier associated with the "D" electrode malfunctioned, D would equal zero and the coordinates could still be obtained with the ratios (A)/(A + B + C) and (C)/(A + B + C).

Capacitive arrays may be placed edge to edge to form larger arrays or to form arrays having unusual shapes. When this is done, some peripheral electrodes can be commonly connected to the same amplifier to reduce the number of amplifiers needed. For example, it is possible to implement an array having 15 subarrays (with four peripheral electrodes each) with only six amplifiers. It is done in the following manner. The total array has a circular shape comprising an inner circular area X (bullseye) and an outer toroidal shaped area Y. Three pie-shaped subarrays are fitted into area X and area Y is divided into 12 equal "trapezoidal" shaped sub-arrays. Each sub-array is fitted with four peripheral electrodes. The electrodes are connected to amplifiers 1 to 6 as follows:

| Sub-Array | Amplifiers |
|---|---|
| 1. | 1/2/3/4 |
| 2. | 1/3/4/5 |
| 3. | 1/3/4/6 |
| 4. | 1/4/5/6 |
| 5. | 1/2/5/6 |
| 6. | 1/2/4/5 |
| 7. | 1/2/4/6 |
| 8. | 1/2/3/6 |
| 9. | 1/2/3/5 |
| 10. | 1/3/5/6 |
| 11. | 2/3/4/5 |
| 12. | 2/4/5/6 |
| 13. | 2/3/4/6 |
| 14. | 2/3/5/6 |
| 15. | 3/4/5/6 |

Thus, when signals are received at amplifiers 2, 3, 4 and 5, for example, it is known that a micrometeoroid has impinged on subarray No. 11 since the combination 2/3/4/5 does not apply to any other sub-array. In this arrangement, 9 out of the 15 sub-arrays will still continue to measure precise impact position data even if two amplifiers stop functioning.

What is claimed is:

1. Apparatus for determining the impact location of a micrometeoroid comprising an array of interconnected capacitors for receiving a micrometeoroid impact, first, second, and third electrodes connected to the periphery of said array, said micrometeoroid impact causing a pulse signal to be produced at each electrode, the amplitude of said pulses at said first, second, and third electrodes being A, B and C, respectively, and means coupled to said electrodes for producing signals representative of $(A)/(A + B + C)$ and $(C)/(A + B + C)$, said ratios being indicative of said impact location.

2. Micrometeoroid detection apparatus comprising an array of interconnected capacitors for receiving a micrometeoroid impact; said array comprising a dielectric substrate, a plurality of spaced, cup-shaped, electrical conductors fastened to the surface of said dielectric substrate facing said micrometeoroid, a plurality of spaced electrical conductors fastened to the opposite surface of said substrate, said cup-shaped electrical conductors being positioned with respect to said other conductors so that each cup-shaped conductor overlaps a plurality of said other conductors and vice versa; electrodes connected to the periphery of said array; said micrometeoroid impact causing a pulse signal to be produced at each of said electrodes; the amplitude of each pulse being a function of the distance between said impact and said electrode where said pulse is produced; and means coupled to said electrodes for measuring the location of said micrometeoroid impact.

3. Micrometeoroid detection apparatus as claimed in claim 2 wherein said array is bowl shaped and said electrical conductors are hexagonally shaped.

4. Apparatus for determining the impact location of a micrometeoroid comprising an array of interconnected capacitors for receiving a micrometeoroid impact; said array comprising a dielectric substrate, a plurality of spaced, cup-shaped, electrical conductors fastened to one surface of said dielectric substrate, a plurality of spaced electrical conductors fastened to the opposite surface of said dielectric substrate, said cup-shaped electrical conductors being positioned with respect to said other conductors so that each cup-shaped conductor overlaps a plurality of said other conductors and vice versa, said surface with said cup-shaped conductors facing said micrometeoroid; first, second, and third electrodes connected to the periphery of said array, said micrometeoroid impact causing a pulse signal to be produced at each electrode; the amplitude of said pulses at said first, second, and third electrodes being A, B, and C, respectively; and means coupled to said electrodes for producing signals representative of $(A)/(A + B + C)$ and $(C)/(A + B + C)$, said ratios being indicative of said impact location.

5. Apparatus as claimed in claim 4 wherein said array is bowl shaped and said electrical conductors are hexagonally shaped.

6. Apparatus for determining the charge of a moving micrometeoroid comprising an array of interconnected capacitors for intercepting said micrometeoroid; said array comprising a dielectric substrate, a plurality of spaced, cup-shaped electrical conductors fastened to the surface of said substrate facing said micrometeoroid, a plurality of spaced electrical conductors fastened to the opposite surface of said substrate, said cup-shaped electrical conductors being positioned with respect to said other conductors so that each cup-shaped conductor overlaps a plurality of said other conductors and vice versa; electrodes connected to the periphery of said array; and means coupled to said electrodes for measuring the charge transferred through said array to said electrodes when said micrometeoroid impinges on said array.

7. Apparatus as claimed in claim 6 wherein said array is bowl shaped, said electrical conductors are hexagonally shaped, and each electrical conductor on one surface of said substrate overlaps three electrical conductors on the opposite surface.

8. In a system for analyzing the flight of a micrometeroid, a front detector for receiving said micrometeroid, a rear detector, said front detector being spaced from said rear detector and pentrable by said micrometeroid, first electronic means coupled to said first detector for measuring the coordinates of said micrometeroid penetration on said first detector, second electronic means coupled to said second detector for measuring the coordinates of said micrometeroid impingement on said second detector, means coupled to said first and second electronics means for determining the direction of flight of said micrometeroid, said detectors comprising arrays of interconnected capacitors for receiving a micrometeroid impact, said arrays each comprising a dielective substrate, a plurality of spaced, cup-shaped electrical conductors fastened to the surface of said dielectric substrate facing said micrometeroid, a plurality of spaced electrical conductors fastened to the opposite surface of said substrate, said cup-shaped electrical conductors being positioned with respect to said other conductors so that each cup-shaped conductor overlaps a plurality of said other conductors and vice-versa, electrodes connected to the periphery of each of said arrays, said micrometeroid impact causing a pulse signal to be produced at each of said electrodes, the amplitude of each pulse being a function of the distance between said impact and said electrode where said pulse is produced.

9. In a micrometeoroid detecting system, a first array for receiving a moving micrometeoroid, said first array comprising a plurality of interconnected capacitors, a first electrode connected to one of said capacitors in said first array, a second array comprising a plurality of interconnected capacitors, a second electrode connected to one of said capacitors in said second array, said first array being spaced from said second array and penetrable by said micrometeoroid so that said micrometeoroid can impinge on said second array, a first pulse being generated at said first electrode when said micrometeoroid strikes said first array, a second pulse being generated at said second electrode when said micrometeoroid impinges thereon, and means coupled to said first and second electrodes for measuring the time elapsed between the start of said first and second pulses, said elapsed time being indicative of the velocity of said micrometeoroid.

10. The system of claim 9 wherein said second array is bowl shaped, said first array is disc shaped, and the inside surface of said second array faces said first array.

11. In a micrometeoroid detecting system, a front array for receiving a moving micrometeoroid; a rear array; said front array being spaced from said rear array and penetrable by said micrometeoroid so that said micrometeoroid can impinge on said rear array; each array comprising a dielectric substrate, a plurality of cup-shaped electrical conductors and a plurality of flat electrical conductors, said cup-shaped conductors being spaced apart from each other and fastened to the surface of said substrate facing said micrometeoroid, said flat conductors being spaced apart from each other and fastened to the opposite surface of said substrate, said conductors being staggered so that each cup-shaped conductor overlaps a plurality of flat conductors and vice versa; a first electrode connected to said front array; a second electrode connected to said rear array; a first pulse being generated when said micrometeoroid strikes said front array; a second pulse being generated at said second electrode when said micrometeoroid impinges on said rear array; and means coupled to said first and second electrodes for measuring the time elapsed between the start of said first and second pulses, said elapsed time being indicative of the velocity of said micrometeoroid.

12. Apparatus for analyzing a moving micrometeoroid comprising a hollow hemispherical target for intercepting said micrometeoroid, said inner surface of said target facing said micrometeoroid, said micrometeoroid producing a plasma of ions upon striking said target, means for accelerating said ions toward the center of said hemispherical target, and means located at said center for measuring said ions, the spectra of said ions being representative of the elemental and isotopic makeup of said micrometeoroid.

13. Apparatus for analyzing a moving micrometeoroid comprising a front array for intercepting said micrometeoroid, said array being penetrable by said micrometeoroid, said front array comprising a plurality of interconnected capacitors, first, second, and third electrodes connected to the periphery of said front array, a rear array of interconnected capacitors, fourth, fifth, and sixth electrodes connected to the periphery of said rear array, said micrometeoroid producing a plasma of ions and electrons when it impinges on each array, means coupled to said first, second, and third electrodes for measuring the total charge of said micrometeoroid, means coupled to said first, second, and third electrodes for measuring the impact location of said micrometeoroid on said front array, means coupled to said fourth, fifth, and sixth electrodes for measuring the impact location of said micrometeoroid on said rear array, means coupled between said first electrode and said fourth electrode for measuring the velocity of said micrometeoroid, said front array having a centrally-located aperture, means for focusing the ions from said rear array on said aperture, and means located at said aperture for measuring said ions.

\* \* \* \* \*